H. C. BALDWIN.
Milk and Cream Coolers.
No. 141,688.        Patented August 12, 1873.
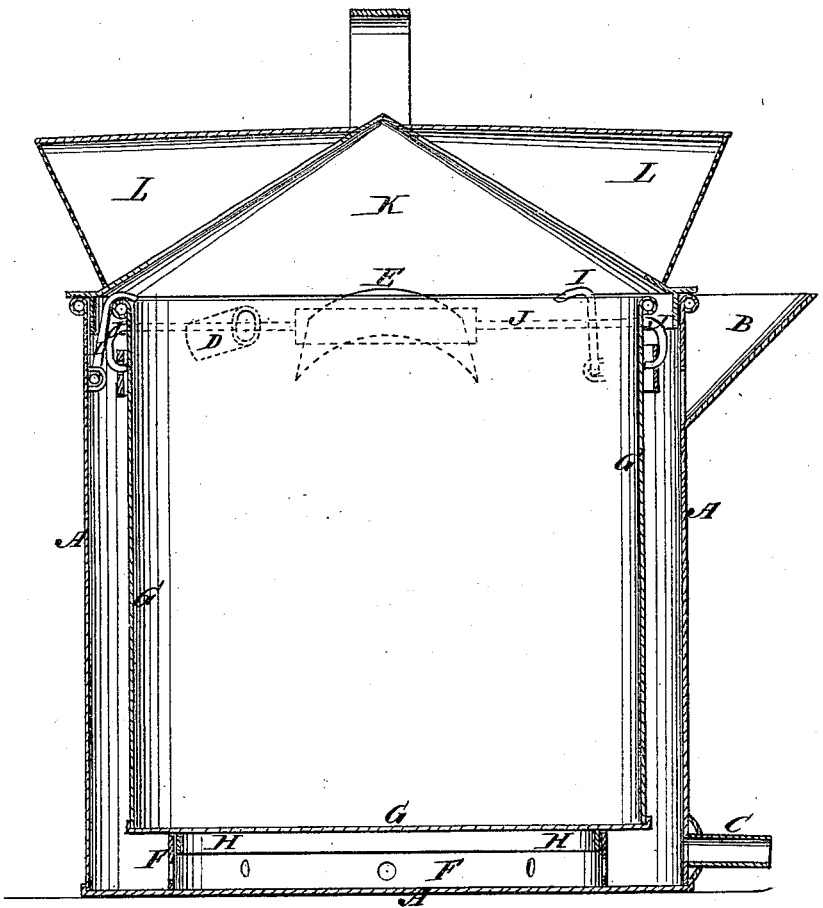
Witnesses:
E. Wolff
C. Sedgwick
Inventor:
H. C. Baldwin
Per Munn & Co.
Attorneys.

UNITED STATES PATENT OFFICE.

HENRY C. BALDWIN, OF NORTH WOLCOTT, VERMONT.

IMPROVEMENT IN MILK AND CREAM COOLERS.

Specification forming part of Letters Patent No. 141,688, dated August 12, 1873; application filed July 19, 1873.

*To all whom it may concern:*

Be it known that I, HENRY C. BALDWIN, of North Wolcott, in the county of Lamoille and State of Vermont, have invented a new and useful Improvement in Cream-Preserver, &c., of which the following is a specification:

The figure is a vertical section of my improved cream-preserver.

My invention has for its object to furnish an improved device for preserving and tempering cream, preserving meat and other things that require to be kept cool. The invention consists in the combination of the outer vessel, provided with a spout, two pipes, a perforated ring-flange, and two or more hooks, the inner vessel, provided with a ring-flange and a bail, and the cover, provided with two or more ventilators, with each other, as hereinafter fully described.

A is the outer case or vessel, which may be made of any desired size, and is provided with a spout, B, upon one side of its upper part, for convenience in pouring in the water. The vessel A is provided with a short pipe or stop-cock, C, in one side of its lower part, for drawing off the water when required. The vessel A is also provided with a short pipe, D, in one side of its upper part, and at a little lower level than the top of the inner vessel, to allow the waste water to escape when a stream of running water is introduced into the spout B. E is a handle, one of which is attached to each side of the vessel A for convenience in carrying it. F is a rim or ring-flange, which is attached to the bottom of the vessel A to support the inner vessel G, so that there may be a water-space between the bottoms of said vessels. The flange F has a number of holes formed in it to allow the water to circulate freely through the space between the bottoms of the said vessels A G. The inner vessel G is made enough smaller than the outer vessel A to leave a space for the water between the sides of the two vessels. The inner vessel G has a ring-flange, H, attached to its bottom to fit into the ring-flange F, and keep the two vessels in the proper relative position. The flange H is made narrow, so as not to close the holes through the flange F. To the inner side of the upper part of the outer vessel A are pivoted two or more hooks, I, to hook over the upper edge of the inner vessel G, to keep it in place when the water is poured in. The vessel G is provided with a bail, J, for convenience in inserting and renovating it. K is the cover, the flange of which fits closely into the mouth of the outer vessel A. The cover K is made conical to form an air-space above the vessels, is provided with a handle for convenience in applying and renovating it, and with two or more spout-like ventilators, L, to allow the air to circulate freely, the mouths of said ventilators being covered with wire-gauze to keep out the dust and insects.

Having thus described my invention, I claim as new and desire to secure by Letters Patent—

The combination of the outer vessel A, provided with a spout, B, pipes C and D, perforated ring-flange F, and hooks J, the inner vessel G, provided with the ring-flange H and bail J, and the cover K, provided with two or more ventilators, L, with each other, substantially as herein shown and described.

HENRY C. BALDWIN.

Witnesses:
J. C. SANBORN,
O. F. CROWELL.